April 18, 1933.    R. BERTHON    1,904,672
PROCESS AND DEVICE FOR REPRODUCING GOFFERED FILMS
Filed June 21, 1929
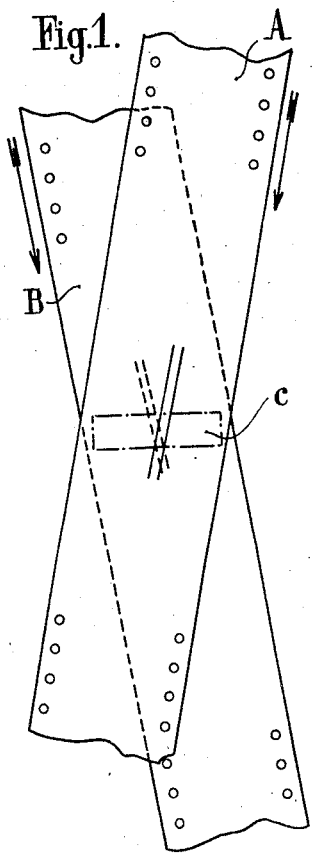
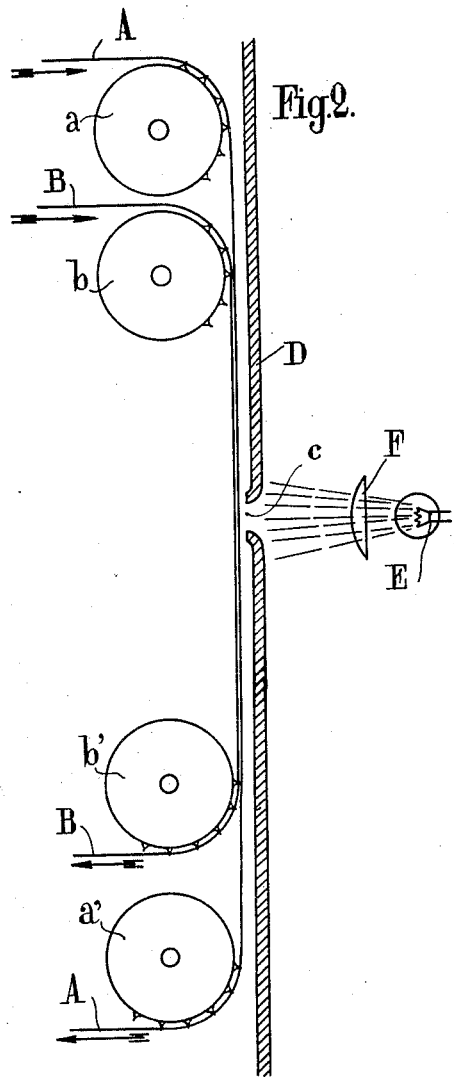
INVENTOR:
Rodolphe Berthon
BY
ATTORNEY Patented Apr. 18, 1933

1,904,672

UNITED STATES PATENT OFFICE

RODOLPHE BERTHON, OF NEUILLY, FRANCE, ASSIGNOR, BY MESNE ASSIGNMENTS, TO KISLYN CORPORATION, OF NEW YORK, N. Y., A CORPORATION OF DELAWARE

PROCESS AND DEVICE FOR REPRODUCING GOFFERED FILMS

Application filed June 21, 1929, Serial No. 372,718, and in France April 17, 1929.

This invention relates to a novel and improved method and apparatus by means of which may be reproduced images from a film of the so-called goffrated type. By the expression "goffrated", I refer to a type of film known in the art which comprises a suitable base having thereon an emulsion sensitive to all colors, commonly known as panchromatic emulsion, and the opposite side of the film support being embossed with goffrated lenticular elements of microscopic dimension. More particularly, the film used in the practice of the present invention preferably has such lenticular elements in the form of cylinders extending longitudinally of the film.

Up to the present time it has been known that a film of the goffrated type may be used for the recording of pictures and for the projection thereof, but so far as I know it has not been possible to properly reproduce images or pictures, or in other words to transfer such images or pictures from one film to another, without the formation of an objectionable moiré effect.

The moiré effect referred to above is caused by the coincidence and non-coincidence of the lenticular elements on the two films, one of which is the original film containing the images which it is desired to transfer to or reproduce on a second film. Theoretically, this moiré effect could be overcome by exactly registering the lenticular elements on one film with those on the other, but this is commercially impracticable because of the microscopic character of the elements and the variable character of the support on which these elements are formed.

According to my present invention, the formation of this moiré effect is obviated by a novel method and apparatus, a selected embodiment of the apparatus and a selected example of the method being illustrated in the accompanying drawing, in which:—

Figure 1 is a fragmentary face view of the two films appearing in Fig. 2;

Figure 2 is a side view showing diagrammatically one form of apparatus with which the invention may be practiced.

Figure 1 shows the two films A and B crossing one another at a much exaggerated angle. Aperture $c$ (dotted) illuminates the crossing point of the film axes. A highly enlarged cylindrical lenticular element is figured in full lines on film A; a similar element to same scale is figured in dotted lines on film B. The height of aperture $c$ is such that the two elements, spaced by their width at top of said aperture, coincide at the bottom thereof. Arrows indicate the direction in which the films are moving.

Film A passes over toothed rollers $a$ and $a'$; film B passes over toothed rollers $b$ and $b'$; the four rollers will rotate at the same speed if provided with the same number of teeth, thereby moving the two films past the aperture $c$ at the same speed. A plate D wherethrough the aperture $c$ is made masks the set. Lastly, a lamp E illuminates window $c$ with or without a condenser F.

In operation the film A is moved past the aperture $c$ at a continuous and uniform rate of speed. While the film is shown as being spaced from the plate in which the aperture is formed, it is of course to be understood that in actual practice this film is closely adjacent to the edges of this aperture to limit the exposure of the film to the size of the aperture. It is also to be understood that while the two films A and B are shown as spaced from each other, they are actually close together and preferably in contact, with the goffrations on the respective films adjacent each other. The goffrations may be in the form of lenses or other refringent elements, but for the sake of simplicity, I shall refer to them in the claims as lenticular elements.

The film B is moved past the aperture at the same rate of speed as is the film A, but the rollers or sprockets $b$, $b'$ are so disposed with relation to the rollers or sprocket $a$, $a'$ that the two films are disposed at a slight angle to each other. As stated above, the angle between the two films is shown in Fig. 1 as greatly exaggerated. In practice this angle is very slight, of the order of 1°, although I do not intend to limit myself to any particular angle.

Referring more particularly to Fig. 1, it will be seen that the relation between the height of the aperture $c$, the width of the elements on the respective films and the angle between the films, is such that during the passage of any given point on the film past the aperture, the two films will be displaced laterally one with respect to the other a distance at least equal to the width of one of the lenticular elements. Under some circumstances it is sufficient if this lateral displacement is as great as one-half the width of one of the elements, but under any circumstances the displacement should be enough to take care of any errors of shrinkage or other inaccuracies. This displacement and the angular relation of the films causes a slight distortion of the copied image. In practice, however, the lenticular elements are usually of the order of 700 to the inch and the shift may be as much as two or three of these elements without noticeable distortion. The angle between the film is also kept so small that any distortion caused thereby is not noticeable.

At the exposure aperture it will be seen that the edges of the two films coincide so that the image transferred from one film to the other is properly placed on the copied film. The height of the aperture $c$ is determined by the amount of shift and the angle of the films with respect to each other, in the illustrated embodiment this being determined by dividing the shift, which is the width of one element, by the sine of the angle between the two films.

The result is that while any section of a lenticular element on the film A is passing the aperture $c$, it will be shifted laterally of the aperture with respect to the film B, such a distance that during the shifting each point on the lenticular element on one film will at some time coincide with all points on a corresponding element on the other film disposed in a line extending in the direction of the shift. That is, considering transverse sections of the two films, each section is made up of alternate hills and valleys and during the shift referred to above a given point in the section, say at the bottom of a valley, will at some time coincide with all points in a section ranging from the bottom of a valley to the top of a hill. This will prevent the formation of any set patent or design and, consequently, obviate the moiré effect.

I wish it to be clearly understood that the above described embodiment is in no way limitative and that any desirable construc- tional modifications and/or alterations may be introduced without departing from the spirit nor from the scope of my invention.

Having now particularly ascertained and described the nature of my said invention as well as the manner in which the same is to be performed. I declare that what I claim is:

1. The method of photographic reproduction which consists in continuously moving an original film having longitudinally arranged lenticular elements thereon past an exposure aperture and transferring the images on said film to a copy film having similarly arranged elements, by passing said copy film continuously past the same aperture at the same speed as the original, while continuously displacing the elements on the copy film with respect to those on the first film to an extent of the order of the width of one of said elements.

2. The method of photographic reproduction which consists in continuously moving an original film having thereon lenticular elements disposed substantially parallel to the length of the film past an exposure aperture and transferring the images on said film to a copy film having similarly arranged elements, by passing said copy film continuously past the same aperture at the same speed as the original, while continuously displacing the elements on the copy film with respect to those on the first film to an extent of the order of the width of one of said elements.

3. The method of photographic reproduction which consists in continuously moving an original film having lenticular elements thereon past an exposure aperture and transferring the images on said film to a copy film having similarly arranged elements, by passing said copy film continuously past the same aperture at the same speed as the original, while continuously displacing the elements on the copy film with respect to those on the first film to an extent of the order of the width of one of said elements.

4. The method of transferring an image from one film to the other, each of which films has on one side thereof a multiplicity of lenticular elements extending substantially parallel to the length of the film which comprises continuously moving said films together and with said lenticulated sides thereof facing each other and at the same speed past an exposure aperture, with the film containing the images adjacent the aperture and during the passage of the film past the aperture continuously displacing one film laterally with respect to the other a distance approximately the width of an element.

5. The method of transferring an image from one film to the other, each of which films has on one side thereof a multiplicity of lenticular elements extending substantially parallel to the length of the film which comprises continuously moving said films together and with said lenticulated sides thereof facing each other and at the same speed past an exposure aperture, with the edges of the films substantially coincident at the aperture and with the film containing the images adjacent the aperture and during the passage of the films past the aperture continuously displacing one film laterally with respect to the other a distance approximately the width of an element.

6. The method of transferring an image from one film to the other, each of which films has thereon a multiplicity of lenticular elements extending lengthwise of the film which comprises continuously moving said films together at the same speed past an exposure aperture of small height with the film containing the images adjacent the aperture and with the longitudinal axes of the two films forming an angle with each other such that during movement of the films past the aperture one element is displaced laterally relatively to the other a distance on the order of the width of one of said elements.

7. The method of transferring an image from one film to the other, each of which films has on one side thereof a multiplicity of lenticular elements extending lengthwise of the film which comprises continuously moving said films together and with said lenticulated sides thereof facing each other and at the same speed past an exposure aperture, with the film containing the images adjacent the aperture and with the longitudinal axes of the two films forming a slight angle with each other, said angle bearing such a relation to the height of said aperture and the width of said elements that during movement of the films past the aperture one film is displaced laterally relatively to the other a distance equal to approximately the width of an element.

8. In a device of the class described having an exposure aperture of small height, means for passing an original film past said aperture, said film having lenticular elements thereon extending longitudinally of the film and substantially parallel to its length, and means for passing a second film past said aperture at a slight angle to said first-named film on the other side of said first-named film from said aperture, said second film having thereon longitudinally arranged lenticular elements substantially parallel to the length of the second film and the angle between said two films being of such an order that during movement of the films past the aperture one film is displaced laterally relatively to the other a distance approximately the width of one of said lenticular elements.

9. The method of transferring an image from one film to the other, each of which films has thereon a multiplicity of lenticular elements extending lengthwise of the film which comprises continuously moving said films together at the same speed past an exposure aperture of small height with the film containing the images adjacent the aperture and with the lenticular elements on the two films forming an angle with each other such that during movement of the films past the aperture one element is displaced laterally relatively to the other a distance on the order of the width of one of said elements.

In testimony whereof, I affix my signature.
RODOLPHE BERTHON.